US011890776B2

(12) United States Patent
Crabb

(10) Patent No.: US 11,890,776 B2
(45) Date of Patent: Feb. 6, 2024

(54) AUTOMATED CUTTING FOR SCENIC FLATS CONSTRUCTION

(71) Applicant: Randy Crabb, Johns Island, SC (US)

(72) Inventor: Randy Crabb, Johns Island, SC (US)

( * ) Notice: Subject to any disclaimer, the term of this patent is extended or adjusted under 35 U.S.C. 154(b) by 129 days.

(21) Appl. No.: 17/720,011

(22) Filed: Apr. 13, 2022

(65) Prior Publication Data

US 2023/0330889 A1     Oct. 19, 2023

(51) Int. Cl.
*B27B 7/04* (2006.01)
*B27B 25/04* (2006.01)
*B27B 27/02* (2006.01)
*B27F 1/04* (2006.01)

(52) U.S. Cl.
CPC ............ *B27F 1/04* (2013.01); *B27B 7/04* (2013.01); *B27B 25/04* (2013.01); *B27B 27/02* (2013.01)

(58) Field of Classification Search
CPC ...... B27F 1/02; B27F 1/04; B27F 1/06; B27F 1/08; B27F 5/02; B27B 7/04; B27B 25/04; B27B 27/02; B27B 5/02; B27B 5/065; B27B 5/075; B27B 5/08
See application file for complete search history.

(56) References Cited

U.S. PATENT DOCUMENTS

| | | | | |
|---|---|---|---|---|
| 170,859 | A * | 12/1875 | James | B27F 1/04 144/204 |
| 1,369,744 | A * | 2/1921 | Hutchinson | B27B 5/201 83/486.1 |
| 1,802,824 | A * | 4/1931 | McNeil | B27C 9/04 200/16 R |
| 1,844,057 | A * | 2/1932 | Buchan | B27F 1/00 144/1.1 |
| 1,861,786 | A * | 6/1932 | Buchan | B27F 1/04 144/133.1 |

(Continued)

*Primary Examiner* — Katrina M Stransky
*Assistant Examiner* — Jared O Brown
(74) *Attorney, Agent, or Firm* — KEATY LAW FIRM LLC; Thomas S. Keaty

(57) ABSTRACT

An automated cutting for scenic flats construction system and method for cutting of wide dadoes accurately spaced along sets of multiple boards to be used as studs or stiles for scenic flats, cleanly and accurately across the boards in one pass for each wide dado cut. A controller controls the automatic operation. A main unit with a support stand and a main-unit shell provides a sled unit extending and retracting along linear-bearing tracks by operation of sled actuators controlled by the controller. The sled unit provides a wide one-pass dado blade assembly capable of cutting a wide dado across multiple boards in one pass as the sled unit is moved along the linear-bearing tracks by the sled actuators under the control of the controller. After initial positioning of the set of uncut boards on an infeed table and against a positioning stop, the set of boards is held in place by hold-down clamps, the wide dado cut is made in one pass of the sled unit with the wide one-pass dado blade assembly, the hold-down clamps are released, the set of boards is moved through the main unit and toward a receiving table by a pre-set distance by a driving dog on a drive chain, the hold-down clamps are activated, and another wide dado cut is made in one pass, all under the control of the controller, repeating until all dado cuts are made to the set of boards.

20 Claims, 8 Drawing Sheets

(56) References Cited

U.S. PATENT DOCUMENTS

| | | | |
|---|---|---|---|
| 3,735,787 A | | 5/1973 | Platt, Jr. |
| 3,779,115 A | * | 12/1973 | Talbert ...................... B27C 5/06 |
| | | | 83/210 |
| 3,838,723 A | | 10/1974 | Sandberg |
| 4,005,738 A | | 2/1977 | Strange et al. |
| 4,132,253 A | | 1/1979 | Mills |
| 4,807,678 A | | 2/1989 | Gray et al. |
| 5,368,079 A | * | 11/1994 | Benway ................... B27B 5/34 |
| | | | 144/237 |
| 5,724,246 A | * | 3/1998 | Heil ................... G05B 19/4097 |
| | | | 83/72 |
| 6,463,970 B1 | * | 10/2002 | Bradshaw ............ B27G 13/005 |
| | | | 144/237 |
| 7,779,737 B2 | * | 8/2010 | Newman, Jr. ........ B23D 45/046 |
| | | | 83/485 |
| 10,293,513 B2 | | 5/2019 | Wang |
| 10,518,916 B2 | * | 12/2019 | Underwood ........... B65G 59/02 |

\* cited by examiner

AUTOMATED CUTTING FOR SCENIC FLATS CONSTRUCTION

BACKGROUND OF THE INVENTION

This invention provides an automated cutting for scenic flats construction system and method.

Scenic flats are used in theatrical and film and video productions. The scenic flats are built to standard finished sizes using standard dimensional lumber, usually nominal 1×3 or 1×4 lumber, for the frame and using thin plywood or luan for the skin or painted surface. Lumber of nominal 1×4 size has a depth of 0.75" and a width of 3.5". Theater productions typically use stage flats with all of the boards of the frame having the wide surface of all boards parallel to the skin surface. Film and video productions typically use studio flats having the wide surface of the stud or stile and rail boards perpendicular to the skin surface, and only the wide surface of the toggle or purlin boards parallel. The thin plywood or luan is only 0.125" to 0.25" thick, and any unevenness or defects in the construction of the underlying frame will cause unevenness or defects in the skin or painted surface of the scenic flat, which will be visible and obvious when the flat is lit, and therefore ruins the flat and makes it unusable.

The horizontal toggles of a studio flat are required to fit into straight lines of dado cuts across several vertical studs. The dado cuts in the studs must be exactly 3.5" wide and 0.75" deep and must be very cleanly made because the toggle must fit exactly into the dado cut, with the wide surface of the toggle exactly even with the narrow surface of the stud. And the dado cuts of each stud must be precisely aligned with the dado cuts of all the other studs in the studio flat so that the toggles will fit properly across all the studs. Often the precise work of constructing studio flats must be done on remote job sites in remote locations, using whatever locally sourced lumber is available, and whatever construction labor with whatever set-construction training and experience that can be found.

Present methods of creating precisely sized and precisely aligned dado cuts having the very large width of 3.5", in a large number of boards, are not adequate for set construction, especially on remote job sites. Most of the present methods require making multiple cuts to make a wide cut. Each of the multiple cuts takes time and introduces a possibility of error. Making multiple cuts for each wide dado cut in a set of wide dado cuts which must align perfectly across multiple studs increases the possibility of error. Cutting with most saws introduces not only a possibility of error, but also of injury, especially with poorly trained labor. Present dado blade stacks are not nearly wide enough and therefore still require multiple cuts. Present table saws require a cumbersome procedure for making a wide dado, and introduce a high possibility of error in the dado cut and injury to the operator. Present radial-arm type of saws have arbors that are only supported on the motor side, and such saws cannot support the mass and the forces exerted on and by a massive wide dado stack. A very wide dado stack would make most present saws wobble, producing bad cuts and possible operator injury.

What is needed is a system and method for making very wide precise dado cuts across multiple boards simultaneously, using only one pass, and then making identical additional wide dado cuts at precise intervals along the boards, with a high degree of automation and a minimum of operator involvement or possibility of operator injury.

U.S. Pat. No. 10,293,513 for a "Dado Indexing Jig and Method of Cutting a Dado," issued on May 21, 2019 to applicant Micro Jig, Inc., provides for a dado indexing jig, which includes a plurality of indexing members and indexing surfaces, which are adjustable relative to one another, and a cutting element to account for a width of a workpiece that corresponds to the width of a dado to be cut. In addition, the indexing surfaces are adjustable to account for a width of a blade or router to cut a dado.

U.S. Pat. No. 4,132,253 for a "Machine for Notching Pallet Stringers," issued on Jan. 2, 1979 to inventor Thomas O. Mills, provides for a notching machine that has a first cutting stage, which makes four vertical cuts in the stringer, the outer two cuts defining the sides of the notch. The second cutting stage of the machine makes a horizontal cut, which first separates a portion of the stringer between the inner two cuts, thereby allowing the drive shaft of the second-stage cutting blade to pass through the partially-formed notch and cut away the remaining portions of the stringer between the outer two cuts to define the notch.

U.S. Pat. No. 3,735,787 for a "Stud and Dado Cutter," issued on May 29, 1973 to assignee Everett A. Platt, Jr., provides for a series of wooden studs that are clamped into a chain-feed means which moves the studs transversely of their length past a plurality of stations. At one station, the studs are cut to length and, at other stations, dadoes are cut in the studs; thus producing a plurality of identical studs with dadoes therein.

U.S. Pat. No. 4,807,678 for an "Apparatus for Notching Pallet Stringers," issued on Feb. 28, 1989 to assignee West Plains Machinery, provides for an apparatus for notching pallet stringers, and the apparatus comprises a skid surface over which the stringers are caused move, and the stringers are held down against the skid surface so that rotary cutting knives can form the notches. The apparatus is provided with a conveyor mechanism for orienting the stringer members in proper positions to encounter the rotary cutting knives regardless of the position when first placed in a crib for the conveyor. The apparatus includes a pusher device to feed stringers into the rotary knives so that the stringers are bunched up for the purpose of using stringers to support each other as they are pushed over the skid surface into the rotary knives.

U.S. Pat. No. 3,838,723 for a "Dual Dado Machine," issued on Oct. 1, 1974 to assignee Commander Industries, Inc., provides for a dual dado machine for use with a work member such as a wood strip, and the machine comprises a main frame having at the front a magazine for a stack of several of the strips. The bottom strip is fed from the magazine simultaneously to occupy a couple of work sites on the main frame. The strip is accurately positioned endwise and is clamped on the main frame by hold down devices. A pair of dado cutters are movable simultaneously from the back of the main frame and in selectable and preferably converging paths through the work sites to make dado cuts through the top of the held strip. The cutters are then returnable to the back of the main frame. The cut strip is released by the hold down devices and is ejected from the machine. The operating sequences are preferably automatically controlled.

U.S. Pat. No. 4,005,738 for an "Automatic Dadoing Machine," issued on Feb. 1, 1977 to assignee Manufacturing Approaches & Total Concepts Inc., provides for a method and apparatus for dadoing cabinet panels. The dadoes are cut by a plurality of routers selectively extended into the panel. The selection of the number of routers, translator movement of each of the routers, and positioning of the panel is controlled by air operated mechanisms. A pneumatic control system processes the operation of the routers in response to the inputs from a plurality of manually settable controls and the signals developed by feedback mechanisms.

U.S. Pat. No. 10,518,916 for a "Material Processing System," issued on Dec. 31, 2019 to inventor Daniel S. Underwood, provides for a material processing system comprising an offsetter configured to receive a stack of material and including a lifting bar configured to lift a portion of the stack of material; and a processing station operably connected to the offsetter. A method of processing a material comprises loading a stack of material on an offsetter, the stack of material including a first portion and a second portion, the first portion positioned above the second portion and separated from the second portion by at least one cross tie, the stack of material including a first end and a second end distal from the first end; lifting the second portion away from the first portion by a lifting bar of the offsetter pushing upward on the second end; and removing the cross tie.

U.S. Pat. No. 5,724,246 for an "Arrangement for the Controlled Notching and Cutting of Framing Components," issued on Mar. 3, 1998 to inventor Edwin Dean Heil, provides for an arrangement for the controlled notching and placement of components, such as studs, wall plates, shelves, and furniture. The arrangement includes a support for supporting the components. A notcher is carried by the support for selectively notching the components bought into contact therewith. A traveling pusher is movably carried by the support for horizontal movement thereof in a first direction towards the notcher and in a second opposite direction away from the notcher. The components are marked with an appropriate code for subsequent assembly. A cutoff saw is carried by the support, such that the notcher is positioned between the cutoff saw and the traveling pusher. A computer coordinates and controls the operation and movement of the traveling pusher, the notcher and the cutoff saw, the marking and the ejecting of the components.

SUMMARY OF THE INVENTION

This invention provides an automated cutting for scenic flats construction system and method for cutting of wide dadoes accurately spaced along sets of multiple boards to be used as studs or stiles for scenic flats, cleanly and accurately across the boards in one pass for each wide dado cut.

A controller controls the automatic operation. A main unit with a support stand and a main-unit shell provides a sled unit extending and retracting along linear-bearing tracks by operation of sled actuators controlled by the controller. The sled unit provides a wide one-pass dado blade assembly capable of cutting a wide dado across multiple boards in one pass as the sled unit is moved along the linear-bearing tracks by the sled actuators under the control of the controller. After initial positioning of the set of uncut boards on an infeed table and against a positioning stop, the set of boards is held in place by hold-down clamps, the wide dado cut is made in one pass of the sled unit with the wide one-pass dado blade assembly, the hold-down clamps are released, the set of boards is moved through the main unit and toward a receiving table by a pre-set distance by a driving dog on a drive chain, the hold-down clamps are activated, and another wide dado cut is made in one pass, all under the control of the controller, repeating until all dado cuts are made to the set of boards.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
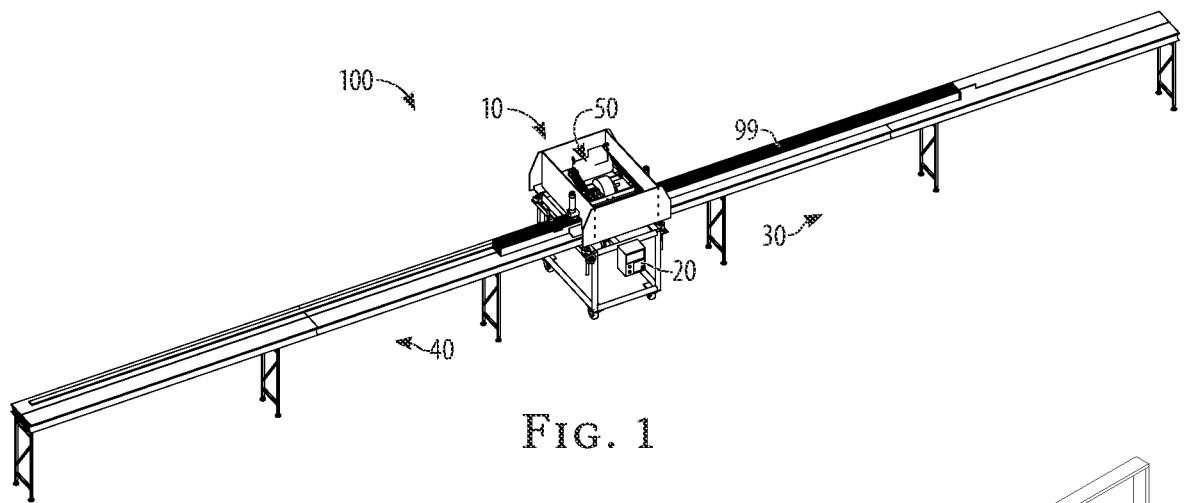
FIG. 1 is a perspective overview of the automated cutting for scenic flats construction system of the invention in use.

Referring to FIG. 1, the automated cutting for scenic flats construction system 100 provides a main unit 10, a controller 20, an infeed table 30, a receiving table 40, and a sled unit 50, for cutting of wide dadoes accurately spaced along sets of multiple boards to be used as studs or stiles for scenic flats, cleanly and accurately across the boards in one pass for each wide dado cut. A set of 8 boards is shown as the workpiece 99.

The infeed table 30 and receiving table 40 have legs with height-adjustable feet and are meant to be mounted end-to-end at the main unit 10 forming a level and continuous surface to support the workpiece 99 at a convenient working height for users.

The controller 20 provides a means for setting the parameters of operation of the automated cutting for scenic flats construction system, for starting and stopping operation by a user, and for tracking correct operation and stopping operation and identifying error conditions. The parameters of operation are changeable and include the distance between dado cuts, which is usually 24 inches center-to-center, the total length of the workpiece set of boards, which determines the number of dado cuts to be made, and adjustments to rotational or linear movement speed needed to adapt to different depths of cut, number of boards per set, qualities of lumber used, or conditions of the lumber or the operating environment.

Figure 2:
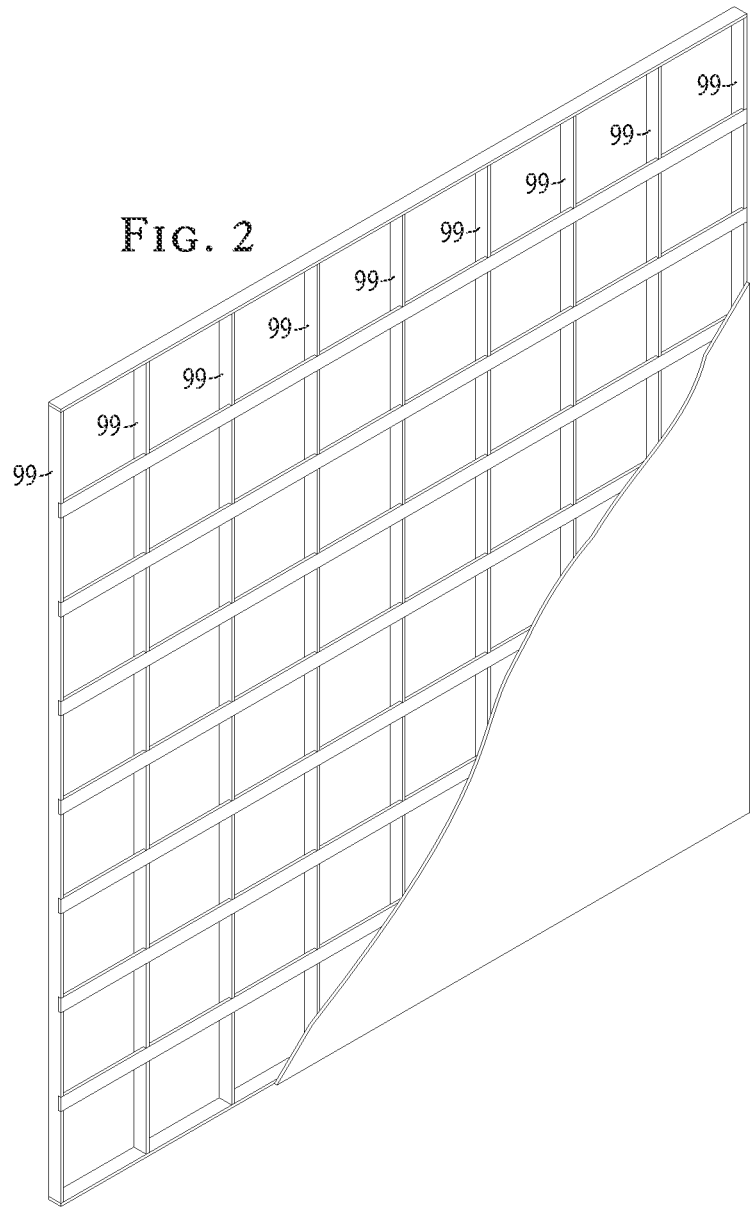
FIG. 2 is a perspective partial cutaway view of a scenic flat having studs made using the automated cutting for scenic flats construction system and method of the invention.

Referring additionally to FIG. 2, the studio flat type of scenic flat has a frame made from wooden boards, usually of one-by-four or one-by-three nominal size. The boards shown are of nominal one-by-four size, 0.75" by 3.5" actual size, and are 16 feet long. The boards set vertically are used as studs or stiles. The boards set horizontally at the top and bottom are used as rails or plates. The studs and rails are set with the wider dimension perpendicular to the painted surface of the flat. The boards set horizontally with the wider dimension parallel to the painted surface are used as toggles or purlins. The toggles provide a much larger surface area for contact with the skin surface, which is usually a thin plywood or luan of 0.25" or 0.125" thickness. The toggles are set into dado cuts or notches made in the studs. It is critical that each dado cut be clean and of the accurate proper size 0.75" deep and 3.5" wide, and that the location of the dado cuts across a set of studs be accurate and uniform, so that the toggles will fit properly into each dado cut and across the set of studs to avoid forming any high, low, or uneven spots which will deform the thin skin surface of the scenic flat, which will be visible and will render the flat unusable.

The automated cutting for scenic flats construction system and method 100 can also improve dado and notch cutting beyond the construction of studio flats. Precise and accurate series of wide and shallow dadoes for lap joints can be created for construction of stage flats, where the framing is parallel to the painted surface, and precise and accurate series of dadoes can be created for purlins and similar components in timber framing and construction.

The modular design of the automated cutting for scenic flats construction system 100 provides for transport to sometimes remote shooting locations and rapid setting up of a job site for construction of scenic flats. The adjustable settings of the automated cutting for scenic flats construction system 100 provide for the use of locally sourced lumber, including lumber following different sizing standards, and non-standard lumber such as plastic lumber, remanufactured lumber, or engineered lumber.

Figure 3:
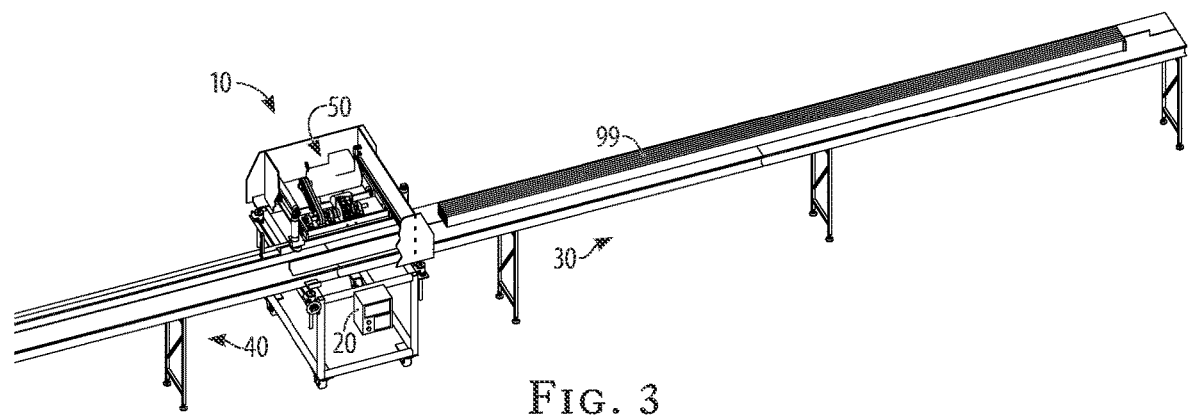
FIG. 3 is a perspective partial view of the automated cutting for scenic flats construction system of the invention.
Figure 4:
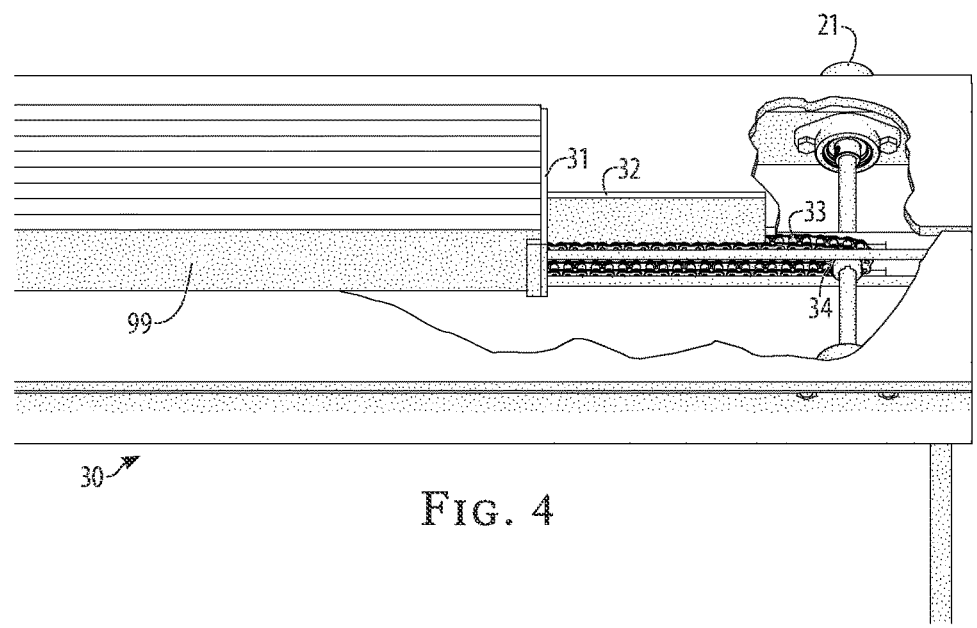
FIG. 4 is a partial cutaway detail view of the chain drive of the infeed table of the automated cutting for scenic flats construction system of the invention.
Figure 5:
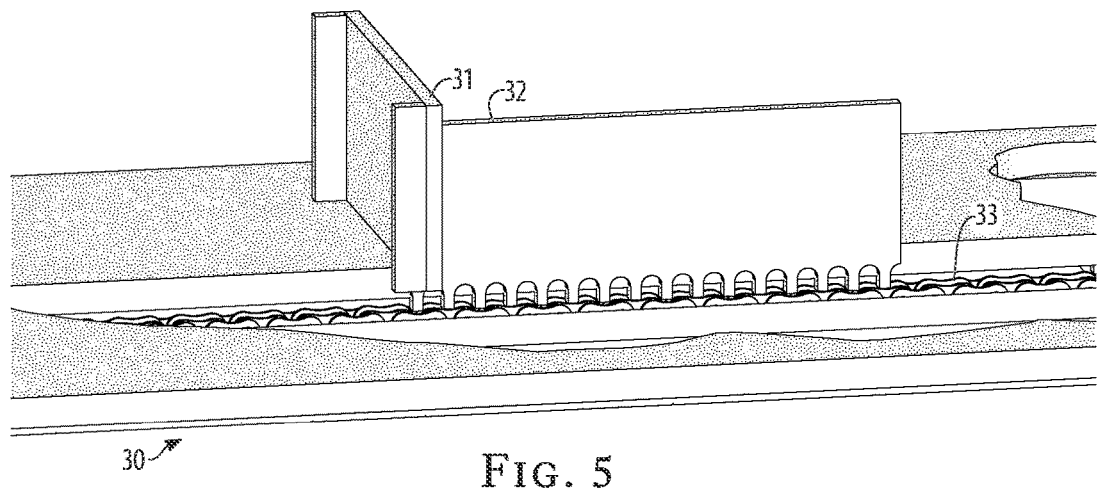
FIG. 5 is a partial cutaway detail view of the driving dog of the infeed table of the automated cutting for scenic flats construction system of the invention.

Referring to FIG. 3, the infeed table 30 provides for feeding the workpiece 99 set of boards into the main unit 10 and through to the receiving table 40. Referring additionally to FIG. 4, the workpiece 99 set of boards is pushed along the infeed table 30 through the main unit 10 by a driving dog providing a dog driving plate 31 and dog driven plate 32 driven by a drive chain 33 driven by a chain sprocket 34 driven by a chain-drive motor 21. The chain-drive motor 21 is controlled by the controller 20 to advance the workpiece 99 an adjustable set distance along the infeed table 30 and through the main unit 10. The chain-drive motor 21 can be an electric stepper motor which provides precise control of degrees of rotation and provides position data back to the controller 20. Toggles are usually placed on 24-inch centers along the studs, and the controller 20 would therefore usually be set for that 24-inch distance. Referring additionally to FIG. 5, the drive chain 33 can be a roller chain and has a fixed distance between rollers which corresponds to the teeth on the chain sprocket 34. In a working embodiment of the automated cutting for scenic flats construction system 100, the distance between rollers is 0.5" on center and the diameter of the rollers is 0.25". The chain sprocket 34 has nine teeth, and 40 degrees of rotation will advance the drive chain 33 one-half inch. The dog driven plate 32 has, at the bottom, slots and teeth corresponding to the rollers and spaces of the drive chain 33, and will move precisely with the drive chain 33. The controller 20 can cause the chain-drive motor 21 to turn through a specified number of degrees of rotation, corresponding to an exact distance of travel of the driving dog, and can receive confirmation of the rotation or of any interference with rotation. Therefore, the controller 20 can cause the workpiece 99 set of boards to be advanced an exact distance between dado cuts, and can initiate cutting of another dado cut after the workpiece has been advanced without error.

Figure 6:
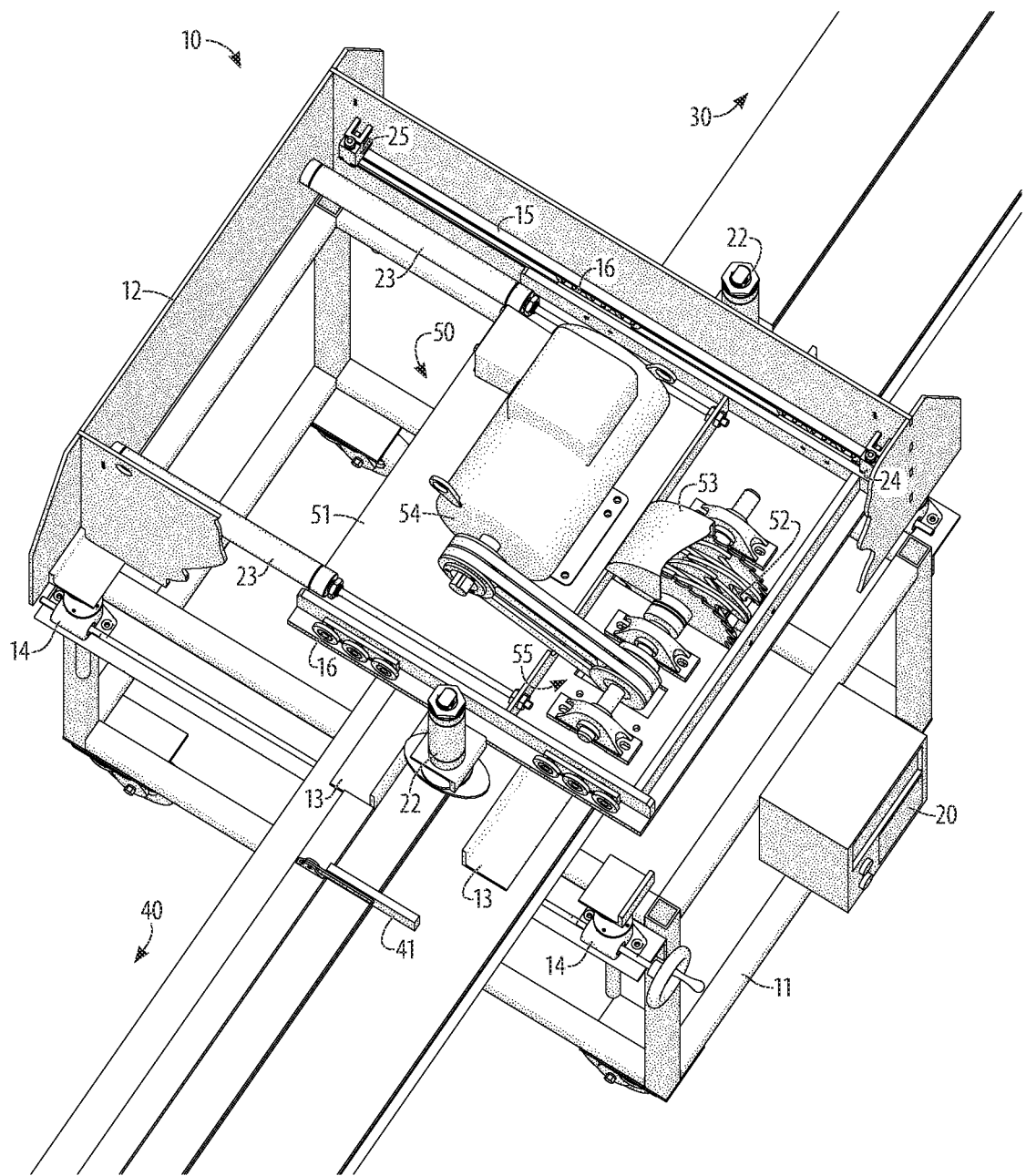
FIG. 6 is a partial cutaway view of the main unit of the automated cutting for scenic flats construction system of the invention.

Referring to FIG. 6, the main unit 10 provides a support stand 11 supporting a main-unit shell 12. In a preferred embodiment, the support stand 11 is made of steel tubing, and the main-unit shell 12 is made of 0.25" steel plates. A two-piece fence 13 is securely and permanently mounted to the bottom of the main-unit shell 12, defining a path for the workpiece 99. In a preferred embodiment, the fence 13 is constructed from steel angle welded to the bottom of an opening in the main-unit shell 12. Adjustment screw jacks 14 are provided to allow setting of the main-unit shell 12 at an adjustable distance above the surface of the infeed table 30 and receiving table 40, which are mounted end-to-end and to the support stand 11 of the main unit 10. The distance of the main-unit shell 12 above the surface of the infeed table 30 and receiving table 40 sets the depth of the dado cut, as treated below.

A sled unit 50 is provided within the main-unit shell 12. The sled unit 50 provides a sled base plate 51 supporting a wide one-pass dado blade assembly 52 having a blade guard 53, and a motor 54 and power transmission subsystem 55 for operating the wide one-pass dado blade assembly 52. Other than rotation of the wide one-pass dado blade assembly 52 in operation, the components of the sled unit 50 are fixed to the sled base plate 51 and do not move in relation to the other components, but only move as a single sled unit 50. In a preferred embodiment, the sled base plate 51 is a 0.5" steel plate. The sled unit 50 moves along linear-bearing tracks 15 mounted to the main-unit shell 12, on linear bearings 16. The movement along linear-bearing tracks 15 provides for stability and precise alignment of the wide one-pass dado blade assembly 52, in turn providing a clean and precise dado cut. Because the sled unit 50 and the wide one-pass dado blade assembly 52 move along the linear-bearing tracks 15 fixed to the main-unit shell 12, the distance of the main-unit shell 12 above the surface of the infeed table 30, set by the adjustment screw jacks 14, sets the depth of the dado cuts in the workpiece 99, which is usually 0.75".

Figure 7:
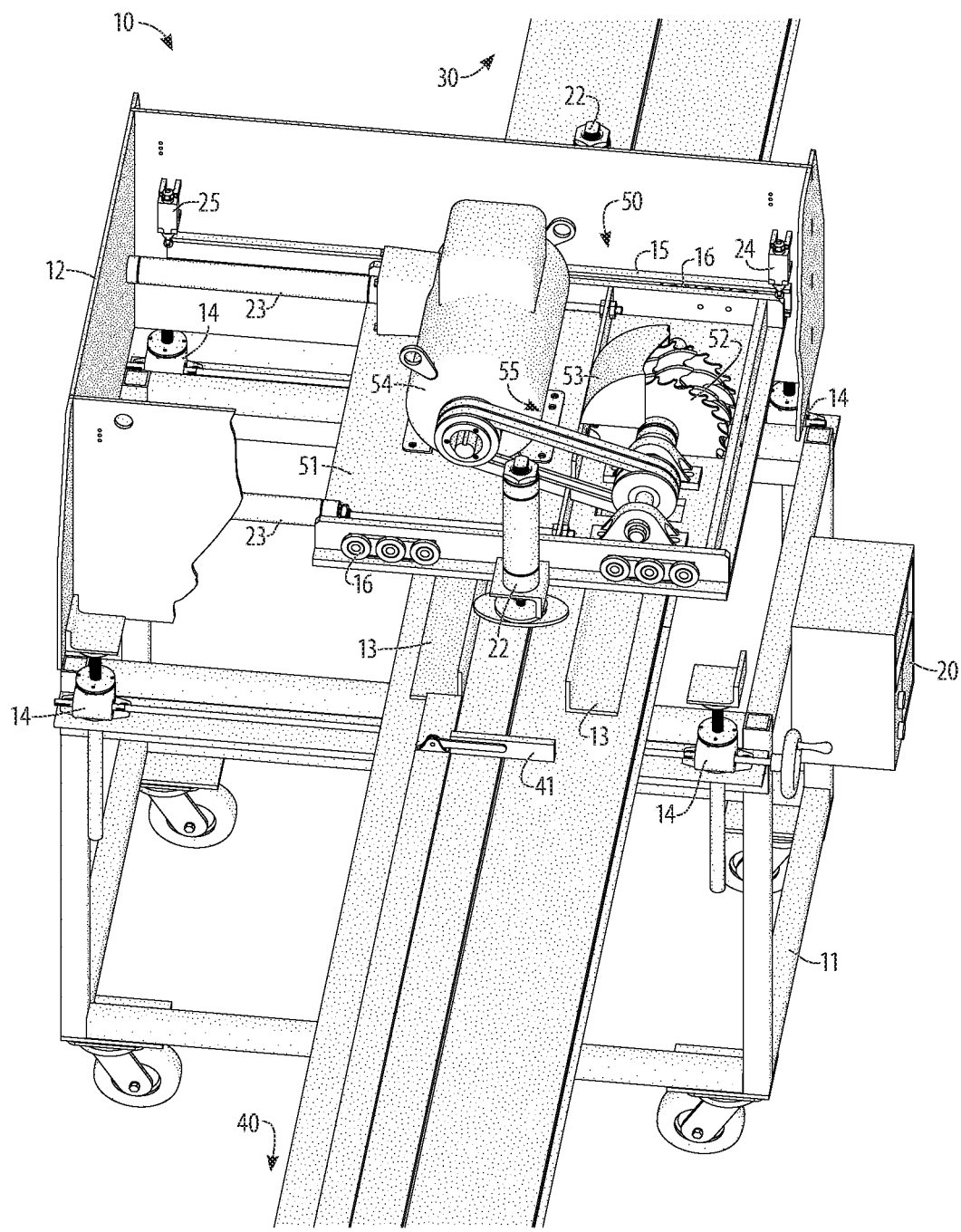
FIG. 7 is a partial cutaway view of the main unit of the automated cutting for scenic flats construction system of the invention with the sled unit extended.
Figure 8:
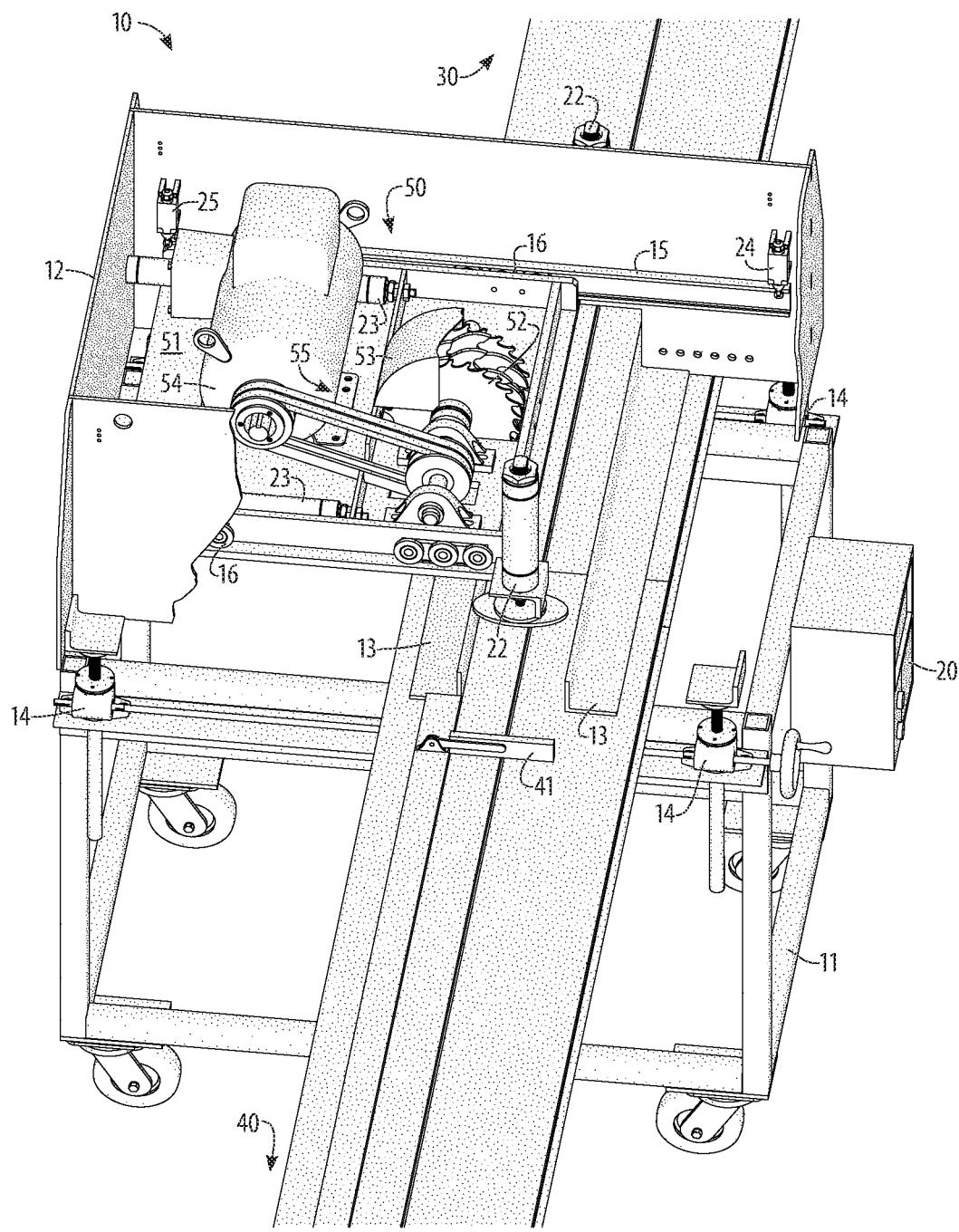
FIG. 8 is a partial cutaway view of the main unit of the automated cutting for scenic flats construction system of the invention with the sled unit retracted.

The sled unit 50 is moved along the linear-bearing tracks 15 by sled actuators 23 controlled by the controller 20. In a preferred embodiment, the sled actuators 23 are pneumatic or air cylinders having two-way push-pull action. Hydraulic cylinders could also be used. Screw jacks actuated by pneumatic, hydraulic, or electric motors could also be used. Optionally, one-way cylinders with spring return could be used. Optionally, a single sled actuator 23 could be provided. The sled unit 50 moves between an extended position as shown in FIG. 7 and a retracted position as shown in FIG. 8. An extend-limit switch 24 senses when the sled unit 50 reaches a limit of extension and a retract-limit switch 25 senses when the sled unit 50 reaches a limit of retraction. The controller 20 provides the necessary command to cause the sled actuators 23 to move the sled unit 50 in the proper direction at the proper rate. In the preferred embodiment, the motivational force is pneumatic, and could also be hydraulic, or could supply an electric stepper motor to in turn supply a screw jack. The controller 20 uses signals from the extend-limit switch 24 and retract-limit switch 25 to stop the movement of the sled unit 50 and to initiate subsequent operations according to the pre-set parameters.

The sled unit 50 provides a motor 54 controlled by the controller 20, which controls starting and stopping of the motor 54 and may control the operating speed of the motor, which may be adjusted to accommodate various qualities of lumber, depths of cutting, rates of cutting, and other conditions. A 220 VAC 5 horsepower electric motor may be appropriate. A motor capable of providing sufficient torque at variable speeds provides an advantage in the ability to adapt the rotational speed of the wide one-pass dado blade assembly 52 for different qualities of lumber and conditions of use. The motor 54 drives the wide one-pass dado blade assembly 52 through a power transmission subsystem 55. In a preferred embodiment, the power transmission subsystem 55 provides a shaft rotating in bearings securely mounted upon the sled base plate 51. The shaft is supported by bearings on both sides of the wide one-pass dado blade assembly 52. The shaft is also supported by bearings on both sides of a belt-driven pulley driven by the motor 54. This arrangement provides sufficient support for the 3.5" wide one-pass dado blade assembly 52, which would place far too much stress on a saw with an arbor supported only on the motor side.

The wide one-pass dado blade assembly 52 is a stack of blades capable of cutting a very wide 3.5" dado with a depth of 0.75" or greater, through a set of multiple boards, in one pass. In a preferred embodiment, the wide one-pass dado blade assembly 52 has a diameter of 8" and provides two 24-tooth 0.125" kerf saw blades, one at either end of the stack. Between the ends, 13 chipper blades each 0.25" wide are arrayed in an offset and balanced arrangement. The wide one-pass dado blade assembly 52 driven by and supported by the power transmission subsystem 55 produce very clean and accurate dado cuts which are essential for the proper fitting of toggles to create a perfectly even surface for mounting the thin skin surface of a scenic flat. The operating speed of rotation of the wide one-pass dado blade assembly 52 is controlled by the controller 20 through the motor 54. The speed of linear travel of the sled unit 50 during cutting is controlled by the controller 20 through the sled actuators 23. The speeds of rotation and of linear travel are controlled by the controller 20 to provide optimal clean and stable cutting of wide and deep dadoes, and can be adjusted to accommodate different numbers of boards cut as a group, depths of cut, qualities of lumber, or conditions, such as extreme heat or cold or wetness or dryness.

In rare circumstances where dado-cut widths of less than or more than 3.5" are needed, the wide one-pass dado blade assembly 52 can be reconfigured in 0.25" increments by removing or adding chipper blades. In circumstances where dimensional lumber is sized in units other than inches, a proper width of cut can be achieved by using one or more odd-sized chipper blades in the stack. Such reconfiguration will require disassembly and reassembly of the wide one-pass dado blade assembly 52.

The wide one-pass dado blade assembly 52 is provided with a blade guard 53 for safety. During operation, the user is shielded from injury by the blade stack or by anything flying off the blade stack. The belt or belts of the power transmission subsystem 55 can also be provided with a guard or shield.

The automated cutting for scenic flats construction system 100 also provides hold-down clamps 22 mounted to opposite sides of the main-unit shell 12 above the fence 13. The hold-down clamps 22 are engaged or lowered, to hold the workpiece 99 set of boards steady against the infeed table 30 surface and against the fence 13 to keep the boards at the proper height and to prevent movement during cutting. The hold-down clamps 22 are then disengaged or raised after a cut is made to allow advancing of the workpiece 99 by the drive dog 31, 32. After the workpiece 99 has been advanced, the hold-down clamps 22 are engaged again before the next cut is made. Operation of the hold-down clamps 22 is controlled by the controller 20, which coordinates operation of the hold-down clamps 22 with operation of the drive dog 31, 32, the sled unit 50, and the wide one-pass dado blade assembly 52. The hold-down clamps 22 can be pneumatic or hydraulic cylinders or can be actuated by electric, pneumatic, or hydraulic motors. The hold-down clamps 22 can have a two-way action or can have a one-way action with spring return.

The receiving table 40 provides a positioning stop 41 which can be placed across the path of travel of the workpiece 99 and can be moved out of the path of travel. The positioning stop 41 is mounted in a position such that when the leading end of the workpiece 99 is placed against the positioning stop 41 the first dado cut will be made at the desired distance from the leading end, which is usually 24 inches on center for studio flats. Variation of distance from the leading end can be accommodated either by moving the positioning stop 41 or by providing multiple positioning stops 41 at various distances. After the workpiece 99 has been positioned, the positioning stop 41 is moved out of the path of travel. Movement of the positioning stop 41 into and out of the path of travel can be done manually by the user, or optionally can be automated under the control of the controller 20 with the provision of a pneumatic, hydraulic, or electric actuator for the positioning stop.

Figure 9:
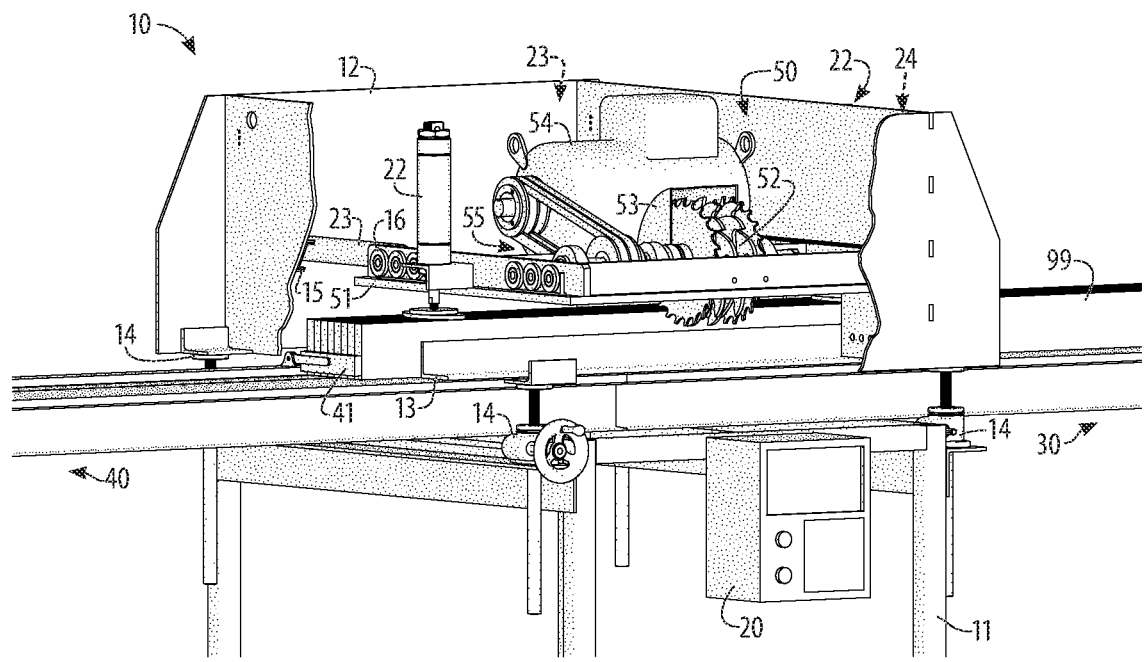
FIG. 9 is a partial cutaway detail view of the main unit of the automated cutting for scenic flats construction system in a first phase of use.

Referring to FIG. 9, in a first phase of use the sled unit 50 is in an extended position, with the wide one-pass dado blade assembly 52 clear of the path of travel of the workpiece 99 set of boards. For safety, in normal operation the motor 54, which is under the control of the controller 20, would not be rotating the wide one-pass dado blade assembly 54. The workpiece 99 is placed upon the infeed table 30 and moved through the fence 13 of the main unit 10 until the leading end rests against the positioning stop 41. After the workpiece 99 has been positioned the positioning stop 41 can be moved out of the way at any time before the workpiece 99 is advanced for a second dado cut.

The depth of the dado cuts to be made, which is usually 0.75", is adjusted by operation of the adjustment screw jacks 14, which raise or lower the main-unit shell 12, and therefore the sled unit 50 and the wide one-pass dado blade assembly 52. After an initial setting of the adjustment screw jacks 14 when setting up on a job site, further adjustment will rarely be needed. The controller 20 receives an initial setting specifying the desired distance between dado cuts and the number of cuts to be made, which corresponds to the length of the workpiece 99. Those settings will normally remain unchanged over the course of a job.

After the workpiece 99 has been positioned against the positioning stop 41, the drive dog as shown in FIG. 4 is put in position with the dog driving plate 31 against the trailing end of the workpiece 99 and the dog driven plate 32 engaged with the drive chain 33.

After the workpiece 99 is positioned and the drive dog 31, 32 has been placed, the user gives a start command to the controller 20. The start command can be given by pressing a button. The controller 20 causes the hold-down clamps 22 to be engaged and hold the workpiece 99 securely against the surface of the infeed table 30 and the fence 13. The controller 20 causes the motor 54 to activate rotation of the wide one-pass dado blade assembly 52 through the power transmission subsystem 55, at an appropriate rotational speed set by the controller 20, as treated above, and allows time for the blade assembly to reach operating speed. The controller 20 then activates the sled actuators 23 to move the sled unit 50 along the linear-bearing tracks 15 toward a retracted position. The wide one-pass dado blade assembly 52 travels with the sled unit 50. The speed of linear travel of the sled unit 50 is controlled by the controller 20, and is set to a speed appropriate for the circumstances, as treated above.

Figure 10:
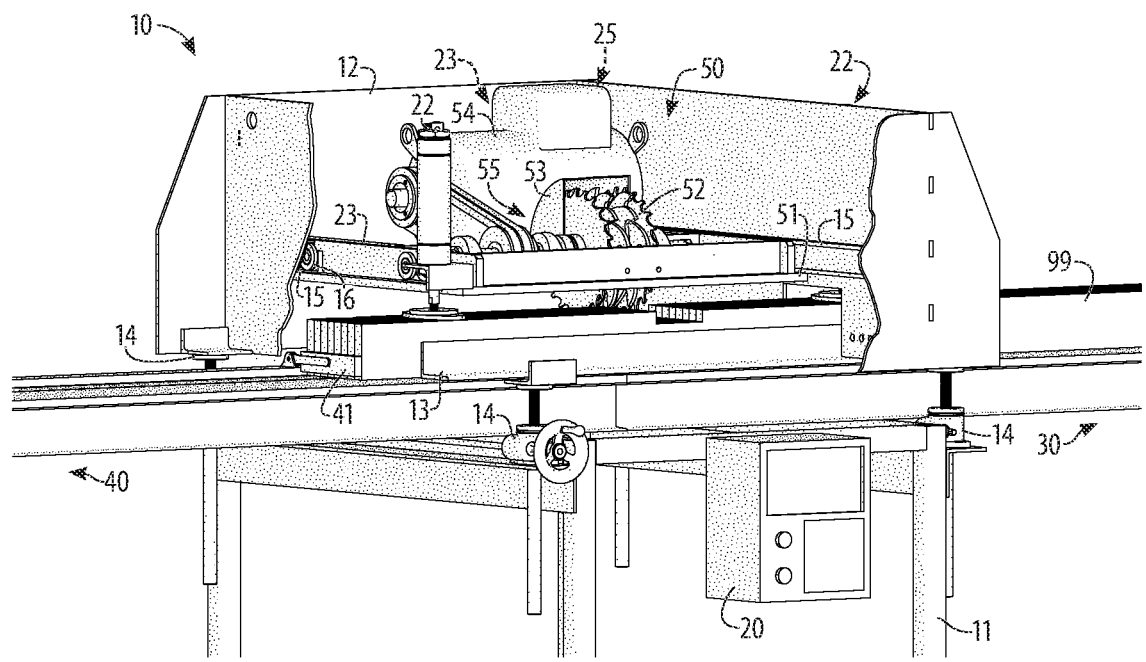
FIG. 10 is a partial cutaway detail view of the main unit of the automated cutting for scenic flats construction system in a second phase of use.

Referring to FIG. 10, the linear travel of the sled unit 50 with the rotating wide one-pass dado blade assembly 52 cuts a wide and deep dado across all of the boards in the workpiece 99. When the sled unit 50 reaches the fully retracted position it is sensed by the retract-limit switch 25, which signals the controller 20 to cause the sled actuators 23 to reverse the direction of travel of the sled unit 50.

Figure 11:
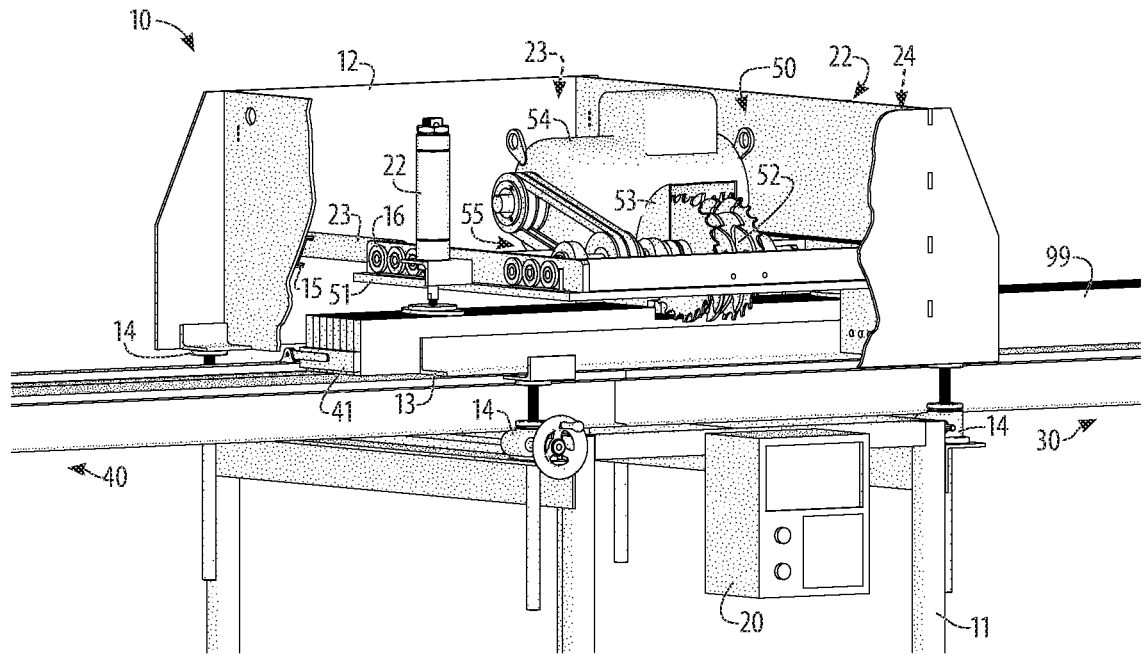
FIG. 11 is a partial cutaway detail view of the main unit of the automated cutting for scenic flats construction system in a third phase of use.

Referring to FIG. 11, when the controller 20 has caused the sled unit 50 to return to a fully extended position, the sled unit 50 is sensed by the extend-limit switch 24 which signals the controller 20.

Figure 12:
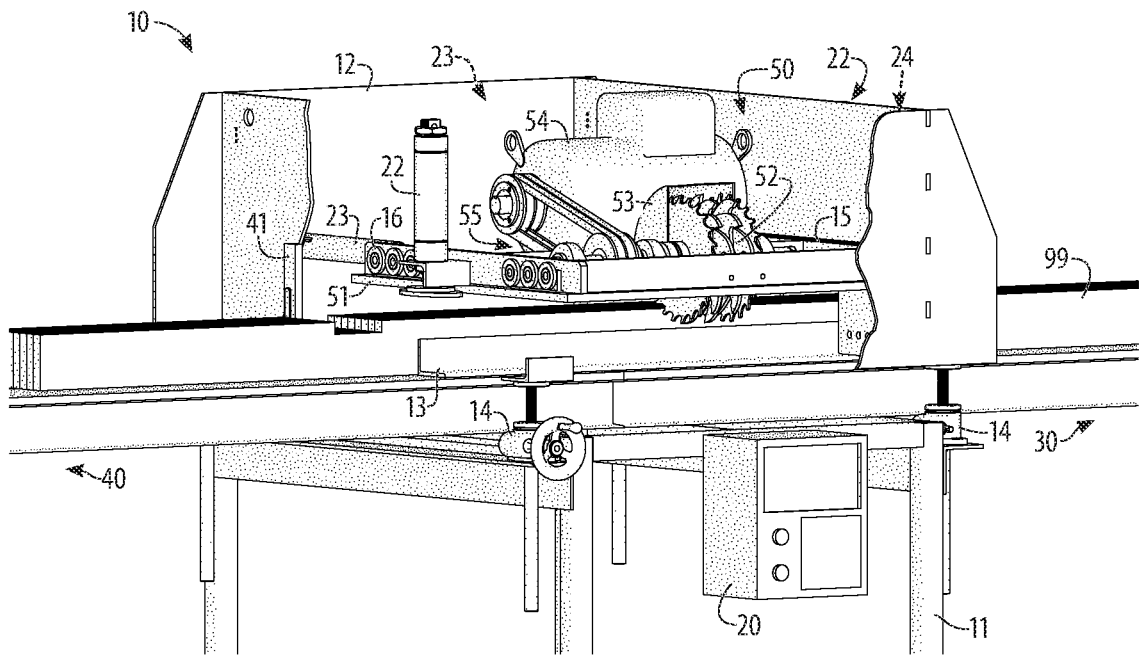
FIG. 12 is a partial cutaway detail view of the main unit of the automated cutting for scenic flats construction system in a fourth phase of use.

Referring to FIG. 12, after the sled unit 50 returns to a fully extended position, with the wide one-pass dado blade assembly 52 clear of the path of travel of the workpiece 99, the controller 20 causes the hold-down clamps 22 to be disengaged, allowing movement of the workpiece 99. The controller 20 then causes the chain-drive motor 21 to actuate the chain sprocket 34, drive chain 33, and drive dog 31, 32 of the infeed table 30 to move the workpiece 99 the specified set distance, which is usually 24" for studio flats. The leading end of the workpiece is moved along the receiving table 40.

Figure 13:
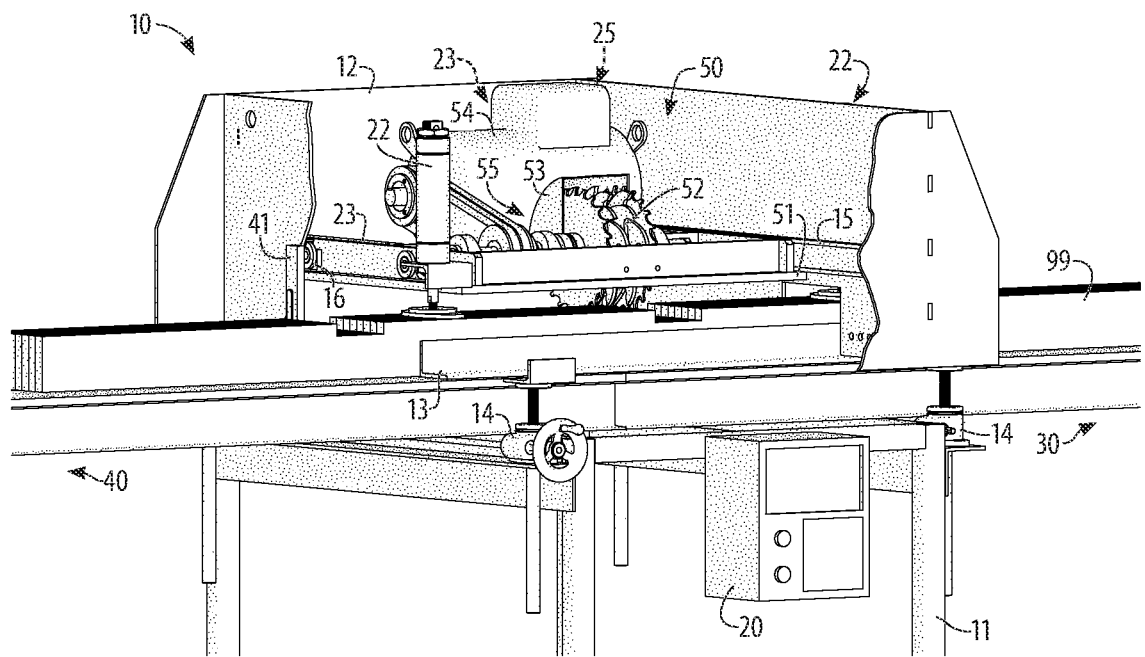
FIG. 13 is a partial cutaway detail view of the main unit of the automated cutting for scenic flats construction system in a fifth phase of use.

Referring to FIG. 13, after the workpiece 99 has been moved the specified set distance, the controller 20 causes the hold-down clamps 22 to be engaged to hold the workpiece against the surface of the infeed table 30 and the fence 13. The controller 20 then causes the sled actuators 23 to move the sled unit 50 with the wide one-pass dado blade assembly 52 along the linear-bearing tracks 15 toward a retracted position, cutting another wide and deep dado across the boards of the workpiece 99.

The process is repeated until the desired number of cuts have been made and the workpiece 99 has been moved onto the receiving table 40 to be removed and used as studs or stiles in the construction of a scenic flat.

Many other changes and modifications can be made in the system and method of the present invention without departing from the spirit thereof. I therefore pray that my rights to the present invention be limited only by the scope of the appended claims.

I claim:

1. An automated cutting for scenic flats construction system for cutting wide and deep dadoes across a workpiece set of boards in one pass, the automated cutting for scenic flats construction system comprising:
    (i) a controller adapted to control operation according to changeable parameters of operation;
    (ii) a main unit having a support stand adapted to support a main-unit shell having a front and back and sides and a substantially open top and bottom;
    (iii) a fence mounted at the bottom of said main-unit shell, adapted to guide movement of the workpiece through said main unit;
    (iv) adjustment screw jacks mounted on said support stand adapted to adjust the height of said main-unit shell above said support stand;
    (v) a sled unit having a sled base plate mounted within said main-unit shell on linear-bearing tracks adapted to allow movement only along a front-to-back axis;
    (vi) a motor mounted on said sled unit, adapted to provide rotational force under control of said controller;
    (vii) a power transmission subsystem mounted on said sled unit, adapted to transmit rotational power from said motor;
    (viii) a wide one-pass dado blade assembly mounted on said power transmission subsystem and extending below said sled base plate with an axis of rotation perpendicular to the front-to-back axis;
    (ix) at least one sled actuator mounted between said main-unit shell and said sled unit, adapted to move said sled unit along said linear-bearing tracks along the front-to-back axis under control of said controller;
    (x) an infeed table removably mounted to said support stand and extending to a first side of said main unit, adapted to support the workpiece before movement through said main unit;
    (xi) two hold-down clamps mounted on said main-unit shell at the sides and above said fence, adapted to clamp and to release the workpiece under control of said controller;
    (xii) a drive chain mounted on said infeed table;
    (xiii) a chain sprocket mounted on said infeed table, adapted to drive said drive chain;
    (xiv) a drive dog adapted to be driven by said drive chain and to move the workpiece along said infeed table toward said main unit;
    (xv) a chain-drive motor mounted on said infeed table, adapted to drive said chain sprocket, said drive chain, and said drive dog along said infeed table under control of said controller;
    (xvi) a receiving table removably mounted to said support stand and extending to a second side of said main unit, adapted to support the workpiece after movement through said main unit; and
    (xvii) a positioning stop movably mounted on said receiving table, adapted to define an initial position for placement of the workpiece;
    where, in use, upon command, said controller causes said hold-down clamps to engage, said motor to rotate said wide one-pass dado blade assembly, said sled actuator to move said sled unit along the front-to-back axis from an extended position to a retracted position, thereby moving said wide one-pass dado blade assembly across the workpiece and cutting a dado in one pass, said sled actuator to move said sled unit back to an extended position, said hold-down clamps to disengage, said chain-drive motor to move said drive dog along said infeed table thereby pushing the workpiece into position for subsequent cutting, repeating the process for a defined number of subsequent cuttings.

2. The automated cutting for scenic flats construction system of claim 1, further comprising a blade guard mounted on said sled unit.

3. The automated cutting for scenic flats construction system of claim 1, where said wide one-pass dado blade assembly further comprises a stack of blades having a diameter of 8 inches and making a dado cut 3.5 inches wide.

4. The automated cutting for scenic flats construction system of claim 1, where each of the at least one sled actuator is a pneumatic two-way cylinder.

5. The automated cutting for scenic flats construction system of claim 1, where each of the at least one sled actuator is a hydraulic two-way cylinder.

6. The automated cutting for scenic flats construction system of claim 1, where each of the at least one sled actuator is a screw jack actuated by an electric motor.

7. The automated cutting for scenic flats construction system of claim 1, where each of the at least one sled actuator is a screw jack actuated by a pneumatic motor.

8. The automated cutting for scenic flats construction system of claim 1, where each of the at least one sled actuator is a screw jack actuated by a hydraulic motor.

9. The automated cutting for scenic flats construction system of claim 1, where said hold-down clamps are pneumatic cylinders.

10. The automated cutting for scenic flats construction system of claim 1, where said hold-down clamps are hydraulic cylinders.

11. The automated cutting for scenic flats construction system of claim 1, where said chain-drive motor is an electric stepper motor.

12. The automated cutting for scenic flats construction system of claim 1, where said drive chain is a roller chain.

13. The automated cutting for scenic flats construction system of claim 1, where said positioning stop is further adapted to be moved under the control of said controller, and said controller is further adapted to control movement of said positioning stop.

14. The automated cutting for scenic flats construction system of claim 1, further comprising an extend-limit switch and a retract-limit switch mounted on said main-unit shell, adapted to sense the position of said sled unit at the fully extended and fully retracted positions and to signal said controller.

15. The automated cutting for scenic flats construction system of claim 1, where said power transmission subsystem further comprises a shaft supported by bearings on both sides of said wide one-pass dado blade assembly.

16. The automated cutting for scenic flats construction system of claim 1, where said power transmission subsystem further comprises a shaft supported by bearings on both sides of a belt-driven pulley driven by said motor.

17. The automated cutting for scenic flats construction system of claim 1, where said motor is capable of providing torque at variable speeds.

18. The automated cutting for scenic flats construction system of claim 1, where said wide one-pass dado blade assembly further comprises a stack of two 24-tooth saw blades and thirteen chipper blades.

19. The automated cutting for scenic flats construction system of claim 1, where said main-unit shell is made from 0.25-inch steel and said sled base plate is made from 0.5-inch steel.

20. An automated cutting for scenic flats construction method for cutting wide and deep dadoes a workpiece set of boards, the automated cutting for scenic flats construction method comprising:
(i) providing an automated cutting for scenic flats construction system comprising:
(a) a controller adapted to control operation according to changeable parameters of operation;
(b) a main unit having a support stand adapted to support a main-unit shell having a front and back and sides and a substantially open top and bottom;
(c) a fence mounted at the bottom of said main-unit shell, adapted to guide movement of the workpiece through said main unit;
(d) adjustment screw jacks mounted on said support stand adapted to adjust the height of said main-unit shell above said support stand;
(e) a sled unit having a sled base plate mounted within said main-unit shell on linear-bearing tracks adapted to allow movement only along a front-to-back axis;
(f) a motor mounted on said sled unit, adapted to provide rotational force under control of said controller;
(g) a power transmission subsystem mounted on said sled unit, adapted to transmit rotational power from said motor;
(h) a wide one-pass dado blade assembly mounted on said power transmission subsystem and extending below said sled base plate with an axis of rotation perpendicular to the front-to-back axis;
(i) at least one sled actuator mounted between said main-unit shell and said sled unit, adapted to move said sled unit along said linear-bearing tracks along the front-to-back axis under control of said controller;
(j) an infeed table removably mounted to said support stand and extending to a first side of said main unit, adapted to support the workpiece before movement through said main unit;
(k) two hold-down clamps mounted on said main-unit shell at the sides and above said fence, adapted to clamp and to release the workpiece under control of said controller;
(l) a drive chain mounted on said infeed table;
(m) a chain sprocket mounted on said infeed table, adapted to drive said drive chain;
(n) a drive dog adapted to be driven by said drive chain and to move the workpiece along said infeed table toward said main unit;
(o) a chain-drive motor mounted on said infeed table, adapted to drive said chain sprocket, said drive chain, and said drive dog along said infeed table under control of said controller;
(p) a receiving table removably mounted to said support stand and extending to a second side of said main unit, adapted to support the workpiece after movement through said main unit; and
(q) a positioning stop movably mounted on said receiving table, adapted to define an initial position for placement of the workpiece;
(ii) setting the desired parameters of operation on said controller;
(iii) placing the workpiece on said infeed table;
(iv) advancing the workpiece through said main unit;
(v) placing the workpiece leading end against said positioning stop;
(vi) placing said drive dog at the workpiece trailing end with said dog driving plate against the workpiece and engaging said dog driven plate with said drive chain;
(vii) commanding said controller to start;
(viii) observing the automated operation cutting an accurately spaced series of wide and deep dadoes through the workpiece set of boards, cleanly and accurately, in one pass for each cut;
(ix) removing the set of workpiece boards from said receiving table after the automated operation is finished; and
(x) using the workpiece boards as studs or stiles for construction of scenic flats.

* * * * *